June 5, 1951  J. A. NELSON ET AL  2,555,857
ANTENNA SYSTEM
Filed Nov. 24, 1948  4 Sheets-Sheet 1

Inventors
ARTHUR DORNE
JESSIE ANN NELSON
By
Blair, Curtis & Hayward
Attorneys

June 5, 1951  J. A. NELSON ET AL  2,555,857
ANTENNA SYSTEM

Filed Nov. 24, 1948  4 Sheets-Sheet 4

Inventors
ARTHUR DORNE
JESSIE ANN NELSON

By Blair, Curtis & Hayward
Attorneys

Patented June 5, 1951

2,555,857

UNITED STATES PATENT OFFICE 2,555,857

ANTENNA SYSTEM

Jessie Ann Nelson, New York, and Arthur Dorne, Freeport, N. Y., assignors to Airborne Instruments Laboratory, Inc., Mineola, N. Y.

Application November 24, 1948, Serial No. 61,786

6 Claims. (Cl. 250—33)

This invention relates to high frequency radio antennas. More particularly it relates to unitary antenna systems capable of receiving or radiating radio waves in two separated portions of the frequency spectrum. Such simultaneous dual frequency operation is important for many applications, for example, in an antenna system for aircraft landing systems in which a first range of frequencies is utilized to indicate the relative vertical position of an aircraft, and a second range of frequencies is utilized to indicate the lateral position. Applicant's invention is described as embodied in such an antenna system because certain aspects of the invention are particularly applicable thereto, but with no intention thereby to imply any limitation of use or adaptation.

One procedure followed in the landing of aircraft is illustrated in Figure 1 of the drawings. An aircraft 2, in making a landing, flies along a path, indicated by the broken line 4, in the direction of the arrows. The pilot is enabled to ascertain his position with respect to the airport by suitably placed marker transmitters, which radiate upwardly directed beams, generally indicated at 6 and 8. After passing the marker 8, the aircraft completes a 360 degree turn and descends along a path, indicated by broken line 12, to the airport runway.

When weather conditions are such that it is necessary for the pilot to rely on instrument indications in order to make a safe landing, he requires two types of information which enable him to follow the path 12 to the airport runway: "localizer" information, that is, an indication of the lateral position of the aircraft relative to the path 12, and "glide path" information, that is, an indication of the vertical position or altitude, of the aircraft relative to path 12. This glide path and localizer information is provided by glide path and localizer transmitters, respectively, located in proper relationship to the airport runway. The aircraft, accordingly, must carry suitable high frequency radio apparatus and antennas capable of receiving these two signals simultaneously.

As the density of commercial air traffic increases, it becomes increasingly important to provide a greater number of operating frequencies for each of these signals and to spread these signals over a sufficiently wide portion of the frequency spectrum that interference from adjacent localizer and glide path systems will not interfere with reception of the desired signals. As the designated channels are widened, in order to provide for these additional frequencies, it becomes increasingly difficult to provide acceptable antenna performance. For example, the antenna structure must be capable of receiving signals efficiently throughout both of the channels allocated to these functions, and furthermore, must be capable of receiving these signals without the necessity for retuning, or adjusting, elements or matching networks of the antenna structure.

The requirement for wider band operation makes it increasingly difficult to combine the two antennas into a single mechanical structure, which will operate over the different ranges of frequency without undesirable interaction between the individual antenna elements.

As the flight speed of commercial aircraft has continued to increase, it has become increasingly important that any protruding antenna structures present the minimum possible drag or wind resistance. This has made it desirable to streamline all such structures, and to combine the functions of as many antennas as possible into a single mechanical structure. Therefore, antenna structures having a shape that may be readily streamlined are particularly advantageous for aircraft use.

In accordance with the present invention, an antenna system is provided which meets these various requirements, and which is capable of simultaneous reception of radio signals throughout two relatively wide channels, separated from each other in the frequency spectrum, and in which the reactance coupling between the individual antenna portions is arranged in such manner that the interaction of the antenna elements is beneficial to the operation.

Accordingly, it is an object of this invention to provide an improved wide-band antenna system.

It is another object of this invention to provide improved wide-band localizer and glide path antennas.

Another object is to provide a dual-range, unitary, antenna structure wherein the two antennas are coupled together by two reactive elements.

Still another object is to provide such an antenna in which at least one portion of the reactive elements forms an integral part of the radiating or receiving elements.

It is still another object of this invention to provide an improved unitary high frequency antenna structure capable of simultaneous operation over two separated frequency ranges.

It is a further object of this invention to provide a low-drag, streamlined, dual-frequency aircraft antenna system.

Still another object is to provide an improved unitary aircraft antenna system for the reception of localizer and glide path signals.

Another object is to provide an improved matching arrangement for use in such a system to increase the efficiency of energy transfer between the antenna and the feedline over a wide range of frequencies.

Still a further object of this invention is to simplify the mechanical structure of such a system and thereby to reduce the cost of construction.

The above and other objects of the present invention will appear more fully from a consideration of the detailed description which follows, wherein a preferred embodiment of the invention is described. It will be apparent that changes can be made in the apparatus disclosed without the departing from the spirit of the invention as set forth herein and that certain features of the invention sometimes may be used to advantage without corresponding use of other features.

In order to clarify the following description reference should be had to the accompanying drawings in which.

Because the characteristics of radio antennas are the same, when properly interpreted, whether the antenna is used for radiation or reception, it is to be understood that, although reference generally is made to the antennas described and claimed herein in terms of reception characteristics, the invention is not to be so limited and that these terms are to be understood as including corresponding conceptions of radiation.

In order to receive localizer information, the antenna structure, generally indicated at 14 in Figures 2 to 6, is designed to operate over a first frequency range from 108 to 122 megacycles; and, in order to receive glide path information, to operate over a second frequency range from 320 to 335 megacycles.

To receive the localizer signals, two wing-shaped stubs 16 and 16A (Figure 4) are disposed oppositely on the sides of a semi-circular conductive plane, generally indicated at 18.

Figure 1:
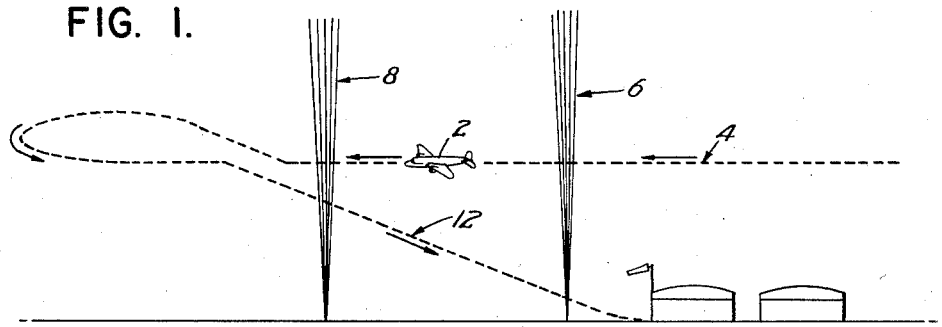
Figure 1 illustrates an aircraft landing system, as described above.
Figure 2:
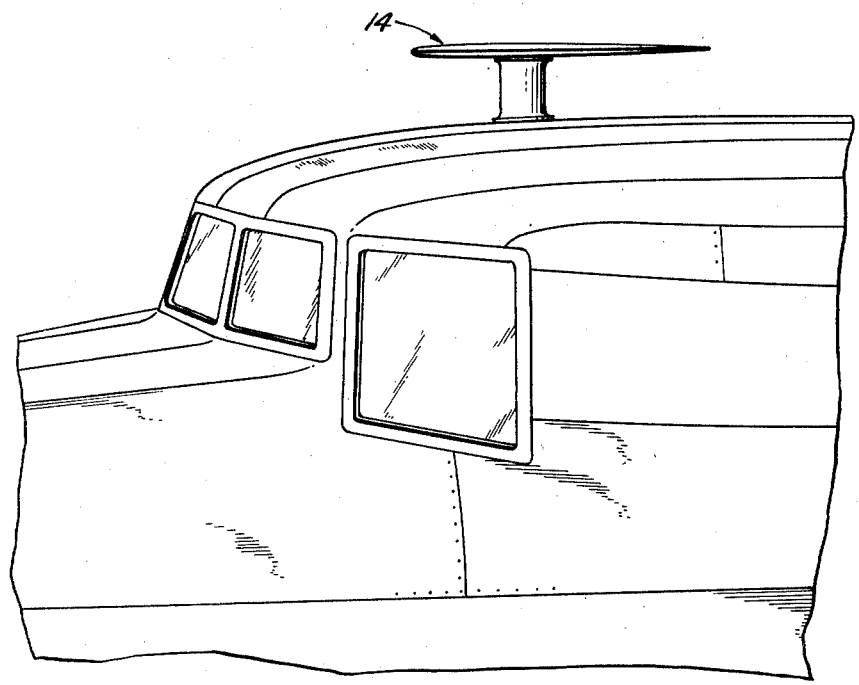
Figure 2 shows a portion of an aircraft with a streamlined localizer and glide path antenna assembly projecting from the upper surface thereof.

To support the plane 18 and the wing stubs 16 and 16A, a cylindrical support 22, having a generally oval cross section, is secured at its upper end to the plane 18; for example, by screws 24 and a reinforcing plate 25. The support 22 extends downwardly from the plane 18 and is provided at its lower end with an outwardly extending flange 26, which is provided with openings 28 so that the antenna structure can be secured readily to the surface of the aircraft, as shown in Figure 2.

In order to conduct electrical energy to and from the antenna structure, it is desirable to utilize a coaxial type transmission line, that is, a transmission line having a center conductor surrounded by a spaced cylindrical conductor, which serves as a shield to prevent undesirable reception or radiation of electrical energy. In order that such a coaxial type transmission line, leading from the receiving equipment (not shown), may be connected readily to the antenna structure, a suitable connector 32 (Figure 3) is provided at the bottom of the antenna structure.

Figure 4:
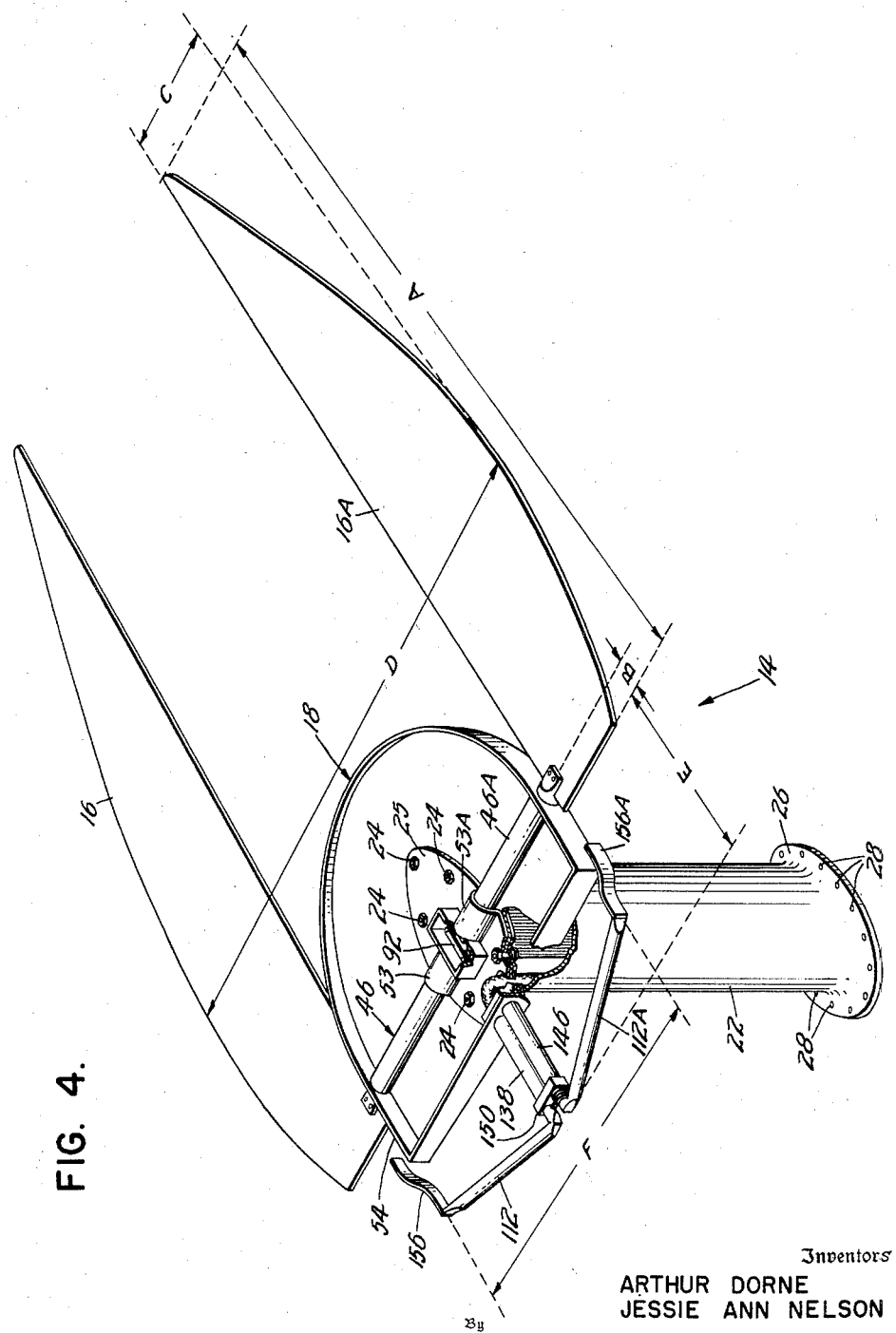
Figure 4 is a perspective view of the metallic portions of the antenna with the streamlined covering material removed.
Figure 5:
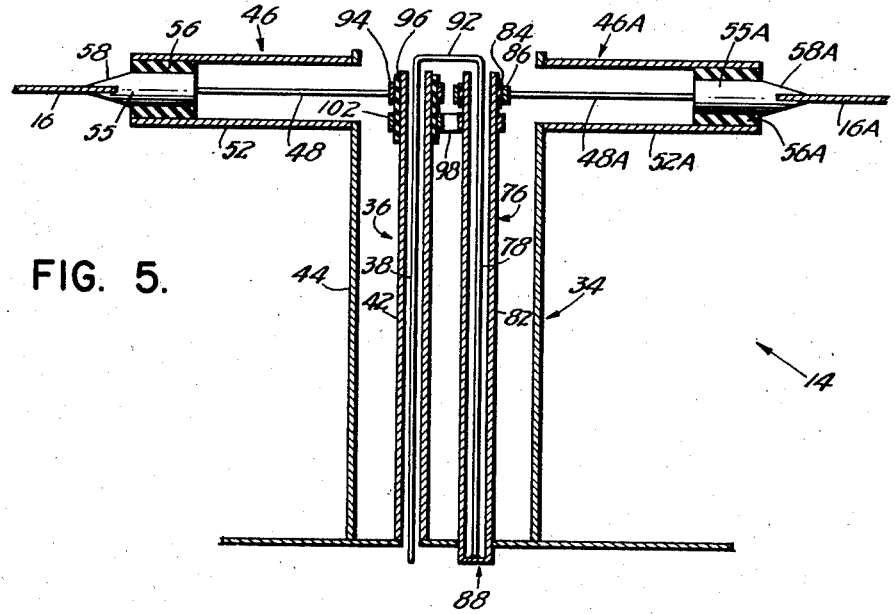
Figure 5 is a partially diagrammatic vertical section illustrating the electrical construction of the transforming and matching portions of the localizer antenna.

Such a coaxial transmission line forms an electrically unbalanced line, whereas the receiving elements (wing stubs 16 and 16A and conductive plane 18) of the antenna form an electrically balanced structure. In order to accomplish the transformation from the balanced to the unbalanced condition, a balance-to-unbalance transformer, hereinafter termed a balun, generally indicated at 34 (Figure 5), is provided. The balun 34 comprises a section of coaxial line generally indicated at 36, having an inner conductor 38 and an outer conductor 42, and extends upwardly from connector 32 surrounded by a cylindrical conductor 44, which, in this example, is rectangular in cross section. The lower end of the cylindrical conductor 44 is adapted to be electrically connected to the surface of the aircraft and near the upper end extends through, and is in electrical contact with, the conducting plane 18, (Figure 4).

In order to transfer electrical energy between the balun 34 and the wing stub 16, a short length of horizontally disposed coaxial line (Figure 5), generally indicated at 46, having an inner conductor 48 and an outer conductor 52, extends outwardly from the balun 34 along the surface of plane 18 to the wing stub 16. The outer conductor 52 is joined at its inner end to conductor 44 of the balun 34 and mechanical rigidity is provided by clamping a section of conductor 52 (Figure 4) between the conductive plane 18 and a U-shaped portion 53 of reinforcing plate 25. Near its outer end conductor 52 passes through a suitable opening in an upwardly extending flange 54, which extends peripherally around conductive plane 18 to increase its mechanical strength.

In order that electrical energy may be transferred efficiently between the radiating or receiving elements of the antenna structure and the coaxial line connected to the receiving equipment, the impedance presented by the radiating or receiving elements must approximate the impedance of the coaxial line over the operating range, or suitable impedance matching elements or transformers must be provided. In order partially to accomplish this impedance transformation, and at the same time provide increased mechanical rigidity, inner conductor 48 is provided near its outer end with an enlarged conductor portion 55 (Figure 5), which is surrounded by an annular sleeve 56 of suitable insulating material, for example, polyethylene, and which is connected by a tapered section 58 to the wing stub 16. The enlarged portion 55 of inner conductor 48 is electrically short in length and, therefore, forms a loading capacitor at the end of coaxial line 46, the remainder of which, in this example, has a characteristic impedance of approximately 25 ohms. The impedance presented by the wing stub 16 and the capacitance, formed by the enlarged conductor portion 55, is transformed by the coaxial line 46 so that in cooperation with the remainder of the impedance matching structure, the impedance mismatch is effectively reduced.

The radiating element comprising wing stub 16A is electrically in series with the radiating structure just described and is coupled to the balun 34 by a similar arrangement, including a coaxial line, generally indicated at 46A, having an inner conductor 48A and an outer conductor 52A. The outer end of inner conductor 48A includes an enlarged portion 55A surrounded by an insulating sleeve 56A, all of which is similar to the oppositely disposed structure described above.

In order to further reduce the impedance mismatch, a series tuned circuit is provided comprising two series capacitances and a series inductance, which is formed by a shorted section of coaxial line, generally indicated at 76, and which, in this example, has a characteristic impedance of 75 ohms. The coaxial line 76 has an inner conductor 78 and an outer conductor 82. The outer conductor 82 is connected near its upper end to inner conductor 48A of coaxial line 46A through one of the series capacitances, formed by a sleeve of insulating material 84, which surrounds a portion of outer conductor 82, and a metallic annular ring 86 which encircles the sleeve 84 and is electrically connected to the inner end of conductor 48A. The inner conductor 78, which is short circuited to the outer conductor 82 at its lower end, as at 88, extends upwardly slightly above the open upper end of outer conductor 82 and is joined by a horizontally extending metallic strap 92 to the upper end of the inner conductor 38 of coaxial line 36. The other series capacitance is formed between the upper end of outer conductor 42 of coaxial line 36 and the inner end of conductor 48 of coaxial line 46, by a metallic annular ring 94, which surrounds a portion of an insulating sleeve 96, which in turn surrounds outer conductor 42.

In order to load, or tune, the balun, the upper end of outer conductors 42 and 82 are capacitively coupled. This capacitance is formed by a metallic bar 98, which surrounds and is secured to the upper end of outer conductor 82 and extends horizontally to form an annular ring 102 around the insulating sleeve 96. This capacitance, when properly chosen, affects the balance to unbalance transformation, but has such a high reactance that it has no appreciable effect on the impedance transformation characteristics.

Figure 6:
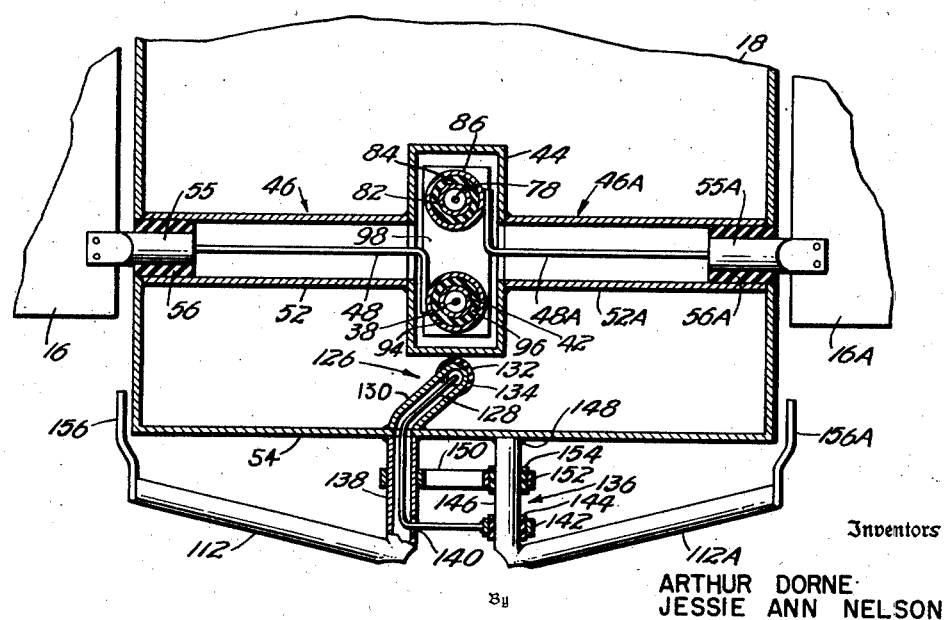
Figure 6 is a partially diagrammatic horizontal section further illustrating the electrical construction of the feeding and matching portions of the glide path and localizer antennas.

The glide path signals are received by means of a bent dipole structure, comprising two outwardly and rearwardly extending arms 112 and 112A, which are supported by conductive surface 18 on the foremost part of the antenna structure (Figure 6).

In order that the glide path receiving equipment (not shown) may be connected conveniently to the antenna structure a coaxial connector 124 (Figure 3) is arranged to extend downwardly from the support 22. A coaxial line generally indicated at 126, having an inner conductor 128 and an outer conductor 130 (Figure 6) extends upwardly from connector 124 within the support 22 and passes through an opening 132 in the conductive plane 18 from which it is insulated by a grommet 134.

In order that energy can be transferred efficiently between the balanced antenna structure and the unbalanced coaxial line 126, a balun generally indicated at 136 is provided. The coaxial line 126 extends forwardly from the opening 132 to the balun 136; the outer conductor 130 being secured to the flange 54 in which a suitable opening is provided for the inner conductor 128.

The inner conductor 128 passes through this opening to form a central conductor within a rigid outer conductor 138, which extends forwardly a short distance and then makes an angular turn to form antenna arm 112. Near the forward end of conductor 138, the inner conductor 128 extends laterally through a clearance opening 140 in the wall of conductor 138 and is coupled by a series capacitance to antenna arm 112A. This capacitance is formed by an annular metallic ring 142 which surrounds a sleeve 144 of suitable insulating material around a forwardly extending conductor 146, the base of which is secured, as at 148, to flange 54, and the forward end of which makes an angular turn to form the antenna arm 112A.

The balun 136 formed by this structure is capacitively loaded by means of a metallic bar 150, which surrounds and is secured to conductor 138 and extends laterally therefrom to form an annular metallic ring 152 around an insulating sleeve 154, which in turn surrounds conductor 146.

Two capacitance flaps 156 and 156A, secured to the outer ends of arms 112 and 112A, respectively, extend rearwardly adjacent, but spaced from, the flange 54. Conveniently, these flaps are constructed of bendable metal so that the capacitance between the respective flaps and the flange 54 can be adjusted readily to the desired value.

The capacitance coupling introduced by flaps 156 and 156A feed energy back over the other radiating surfaces of the antenna structure and broaden the field pattern of the antenna. It is desirable, ordinarily, to adjust the values of these capacitances to achieve the desired beam width with the least radiation in the backward direction. In addition, these flaps provide capacitive loading for the antenna and thus lower the resonant frequency as the value of the capacity is increased.

It is apparent that the particular dimensions of the antenna structure and the values of various impedance elements will be selected in accordance with the desired application to conform with the required operating ranges of frequency and the desired field patterns. The following dimensions are provided to indicate the approximate size of a particular antenna constructed to operate over the aforementioned frequency ranges, and refer to the corresponding letters of Figure 4. The wing stubs 16 and 16A have an overall maximum length of 26.2 inches as indicated by dimension A; the feed point is spaced a distance of 0.88 inch from the foremost part of the wing stubs as shown at B; the maximum width of the wing stubs is 5.2 inches as shown at C; the maximum width of the metal portion of the antenna structure is 22.9 inches from the outside of wing stub 16 to the outside of wing stub 16A as indicated by dimension D; the distance from the front of the wing stubs to the foremost part of the glide path antenna structure is 7.8 inches as shown at E; and the width of conductive plane 18 is 11.5 inches as shown at F.

The section of short-circuited transmission line 76 (Figure 5) has an electrical length of 0.176 wavelength at a frequency of 108 megacycles; and in this particular example, with polyethylene insulation between the inner and outer conductor has a physical length equal to 0.115 of a wavelength in free space. The portion of coaxial lines 46 and 46A having a characteristic impedance of approximately 25 ohms has a length of 3.62 inches; the portion of the lines having the enlarged center conductor 55 and 55A has a length of 1.72 inches. The inside diameter of conductors 52 and 52A may be, typically, about 0.75 inch with the respective inner conductor 48 or 48A about 0.375 inch in diameter. With polystyrene insulating sleeves 56 and 56A the enlarged conductor portions 55 and 55A may have a diameter of about 0.69 inch. The coaxial line sections 36 (Figure 5), 126 (Figure 6), and the coaxial lines which connect the antennas to the receiving equipment may be conventional lines with polystyrene, polyethylene or other suitable insulation and, in this example, advantageously have a characteristic impedance of approximately 50 ohms.

Figure 3:
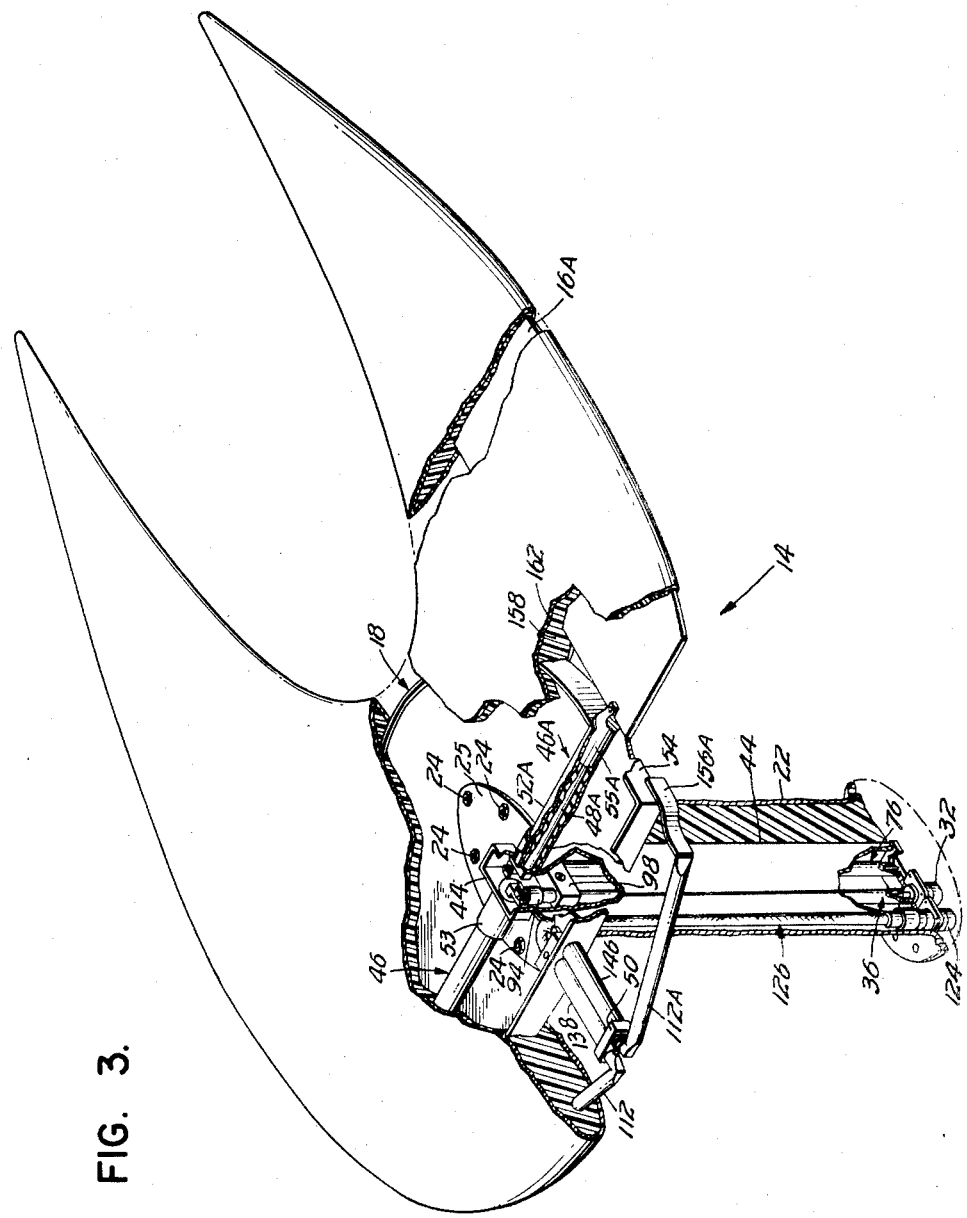
Figure 3 is a perspective view of the antenna assembly with portions thereof cut away to show certain features of the construction.

In order to decrease the wind drag, the entire radiating structure is encased in a suitable streamlined covering of insulating material 158 (Figure 3). This may be, for example, a butadiene rubber compound formed in two halves and applied to the antenna structure by known thermal molding techniques. The entire structure may be encased by a covering 162, for example, of glass cloth impregnated with a phenolic or other suitable binding material.

The antenna described herein is well adapted to attain the ends of objects hereinbefore set forth and to be economically manufactured since the separate elements are well suited to common production methods; the structure being subject to a variety of physical as well as electrical modifications as may be desirable in adapting the invention to other forms or uses.

Various applications of the invention embodied in the antenna system disclosed herein will be suggested to those familiar with the subject matter and it should be obvious that the invention includes but is not limited to the arrangement of the antenna structures in any particular combination, and that numerous changes may be made in the form, construction, arrangement, or deletion of certain of the parts without departing from the spirit or scope of the invention as set forth in the following claims.

We claim:

1. In a high frequency antenna system the combination comprising, a balanced signal receiving structure, a substantially cylindrical base supporting said structure, an unbalanced to balanced connector mounted within said base and connected to said receiving structure, said unbalanced to balanced connector comprising a first section of coaxial transmission line, a second short-circuited section of coaxial transmission line connected in series with the inner conductor of said first coaxial line section, and a shunt loading condenser connected between the outer conductors of said first and second sections of coaxial line, capacitive means coupling said receiving structure to the outer conductors of each of said coaxial line sections, and an external coaxial transmission line connected to said first coaxial line section for conducting energy picked up by said receiving structure.

2. An airborne antenna system for use in a high frequency radio landing system for aircraft, in which a localizer signal indicates relative horizontal position and a glide path signal denotes relative vertical position, said antenna system comprising a supporting base, a localizer signal-receiving antenna supported by said base, a glide path signal-receiving antenna mounted in front of said localizer antenna and supported by said base and having first and second receiving elements, said elements being horizontal, outwardly-directed, spaced conductors raked backwardly toward said first antenna, a reactive circuit coupling said glide path antenna to said localizer antenna thereby to affect the field pattern of said glide path antenna, a first transmission line connected to said localizer antenna for conducting the localizer signal, and a second transmission line separate from said first line connected to said glide path antenna for conducting the glide path radio frequency signal.

3. A combination glide path and localizer antenna system comprising a supporting base, first and second balanced receiving elements supported by said base for receiving localizer signals, said elements comprising rearwardly extending generally streamlined substantially flat sheets, a transmission line extending upwardly within said supporting base, a first and a second coaxial line each connected to said transmission line and having an impedance lower than said transmission line for coupling energy from said transmission line to said first and second radiating elements, respectively, a glide path antenna mounted forwardly of said localizer receiving elements and supported by said base, a first and a second capacitive coupling element for loading said glide path antenna structure and coupling radio frequency between glide path and localizer antenna portions, and a second transmission line connected to said glide path antenna for transferring radio frequency energy therefrom.

4. In a dual antenna system for receiving signals over first and second separated portions of the frequency spectrum, a first balanced antenna having a first and a second receiving element and arranged to receive signals over said first frequency spectrum portion, a first transmission line connected to and arranged to conduct selectively signals picked up by said first antenna, a second antenna positioned adjacent said first antenna including third and fourth receiving elements and a conductive plane positioned adjacent thereto, a second transmission line connected to and arranged to conduct selectively signals picked up by said second antenna, and capacitive coupling means associated, respectively, with said first and second receiving elements and with said conductive plane for coupling radio frequency energy from said first to said second antenna.

5. In a dual antenna system for receiving signals over two separated portions of the frequency spectrum, a base, a first balanced signal receiving structure having first and second oppositely disposed receiving elements, a first transmission line connected to said first signal receiving structure, a second balanced signal receiving structure supported by said base and having third and fourth oppositely disposed receiving elements, a second transmission line connected to said second signal receiving structure, a conductive plane supported by said base between said third and fourth receiving elements, first and second capacitive coupling elements associated, respectively, with said first and second receiving elements and with said conductive plane, for coupling radio frequency energy from said first structure to said conductive plane.

6. A combination glide path and localizer antenna system comprising: an upwardly extending tubular support, a localizer unbalanced to balanced connector portion, a localizer radiating portion, a glide path unbalanced to balanced connector portion, and a glide path radiating portion; said localizer unbalanced to balanced connector portion including a first coaxial feed line having first inner and outer conductors extending upwardly within said support for conducting localizer radio signals, a downwardly extending short-circuited coaxial transmission line having second inner and outer conductors, said second inner conductor being connected to said first inner conductor of said coaxial feed line, a capacitive loading element extending between said first outer conductor and said second outer conductor, and a generally cylindrical conductor extending upwardly within said support and surrounding said first feed line and said short-circuited transmission line; said localizer radiating portion including a plane radiating structure connected to and carried by said support, first and second localizer radiating elements comprising backwardly extending tapered flat sheets for receiving, in combination with said plane radiating structure, the localizer signals, a first and a second horizontal outwardly extending transmission line each having third inner and outer conductors and having a characteristic impedance lower than the characteristic impedance of said feed line, said third outer conductors being connected at their inner ends to said cylindrical conductor, said third inner conductors being connected at their inner ends by series capacitance to said first and second outer conductors, respectively, and at their outer ends to said localizer radiating elements, and first and second shunt capacity elements positioned, respectively, at the outer ends of said third inner conductors to provide shunt loading capacitance between the inner and outer conductors of said horizontal transmission lines; said glide path unbalanced to balanced connector portion including a glide path coaxial feed line extending upwardly within said support and having fourth inner and outer conductors, first and second spaced, parallel, rigid, forwardly-extending, supporting elements secured to and carried by said plane radiating structure, said fourth inner conductor extending through a portion of said first element and being capacitively coupled to said second supporting element, said fourth outer conductor being connected to said first supporting element substantially at the point of support by said plane radiating structure, and a shunt capacitor connected between said first and second supporting elements and spaced from said radiating plane; said glide path radiating portion including first and second glide path radiating elements connected, respectively, to the forward ends of said first and second supporting elements and extending outwardly and rearwardly toward said plane radiating structure, and first and second bendable metallic flaps secured, respectively, to the outer ends of said first and second glide-path radiating elements and extending near, but spaced from, said plane radiating structure for coupling radio frequency energy between said glide path antenna portion and said plane radiating structure.

JESSIE ANN NELSON.
ARTHUR DORNE.

REFERENCES CITED

The following references are of record in the file of this patent:

UNITED STATES PATENTS

| Number | Name | Date |
|---|---|---|
| 2,327,418 | Goldman | Aug. 4, 1943 |
| 2,352,977 | Scheldorf | July 4, 1944 |
| 2,368,618 | Sandretto | Feb. 6, 1945 |
| 2,417,895 | Wheeler | Mar. 25, 1947 |